May 30, 1961  D. BIERMANN  2,986,222
ADJUSTABLE PITCH PROPELLER
Filed July 24, 1959  6 Sheets-Sheet 1

INVENTOR.
DAVID BIERMANN
BY Toulmin & Toulmin
ATTORNEYS

May 30, 1961 D. BIERMANN 2,986,222
ADJUSTABLE PITCH PROPELLER
Filed July 24, 1959 6 Sheets-Sheet 2

INVENTOR.
DAVID BIERMANN
BY Toulmin & Toulmin
ATTORNEYS

May 30, 1961 D. BIERMANN 2,986,222
ADJUSTABLE PITCH PROPELLER
Filed July 24, 1959 6 Sheets-Sheet 3
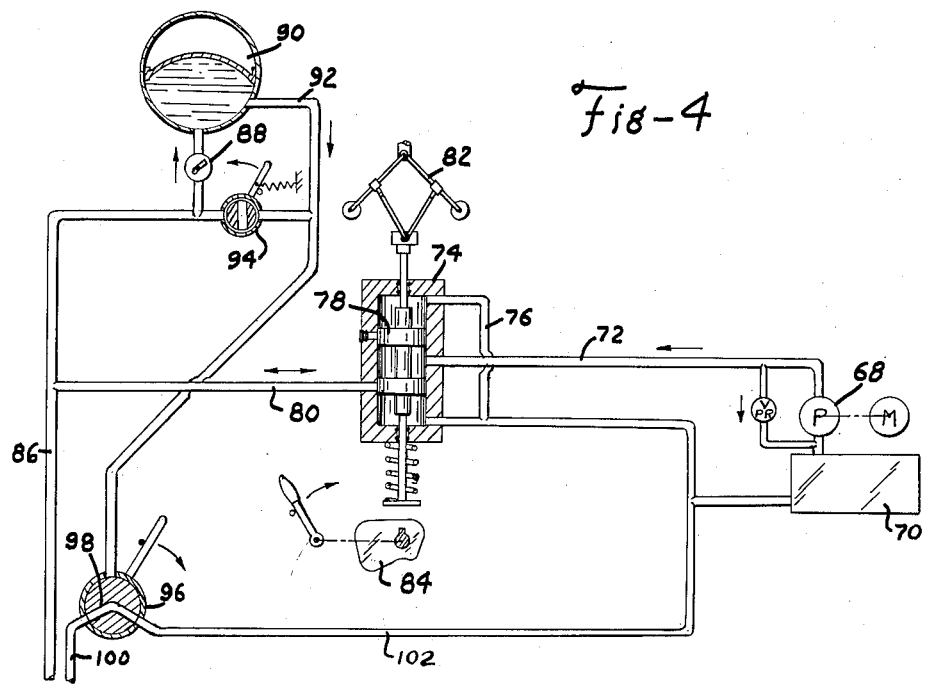
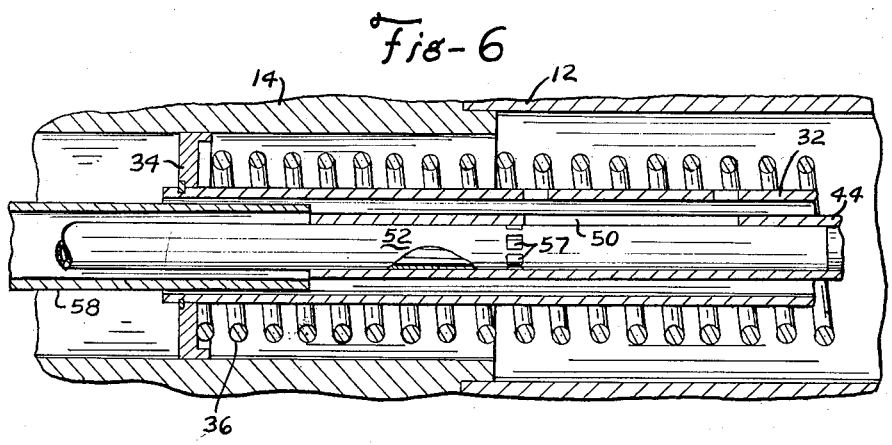
INVENTOR.
DAVID BIERMANN
BY Toulmin & Toulmin
ATTORNEYS

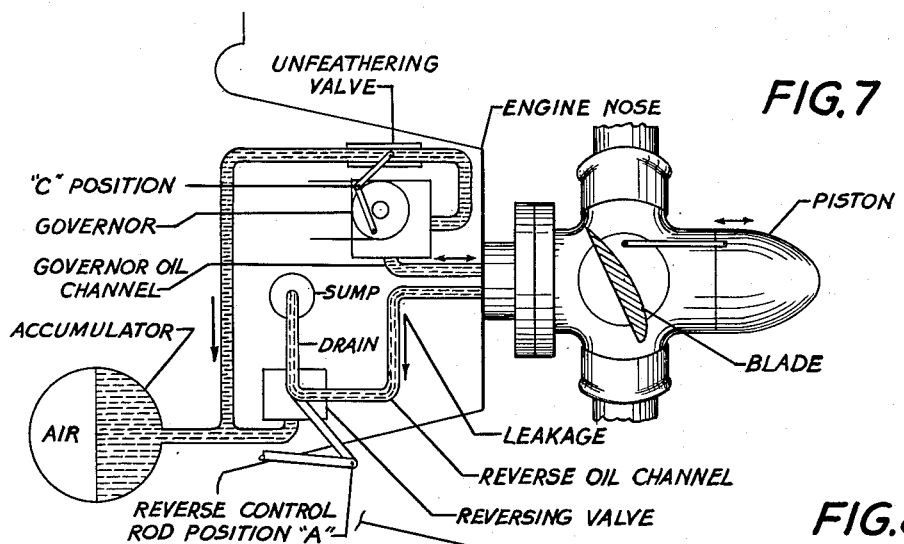
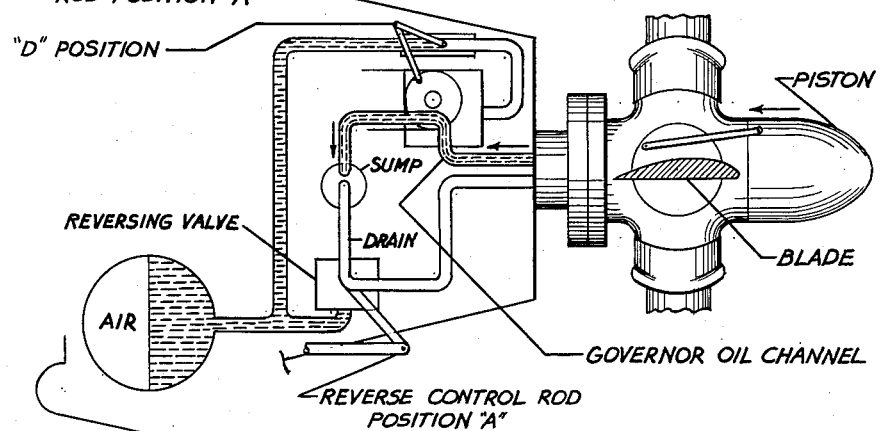
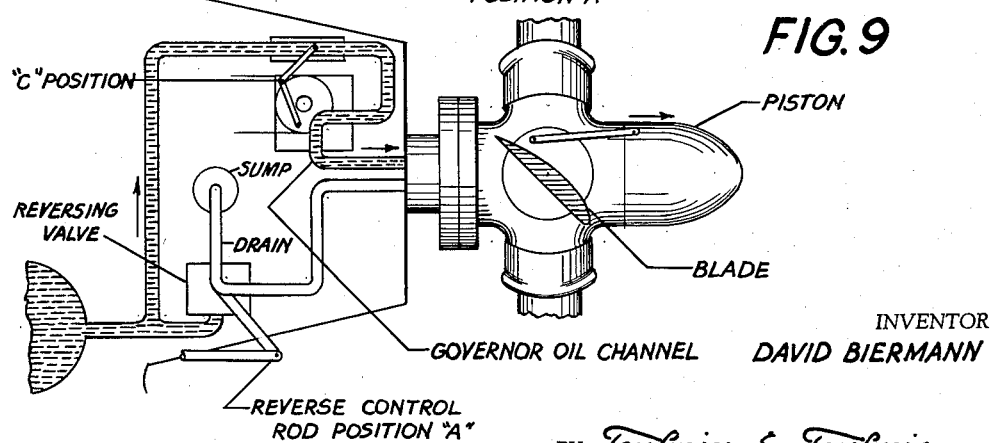

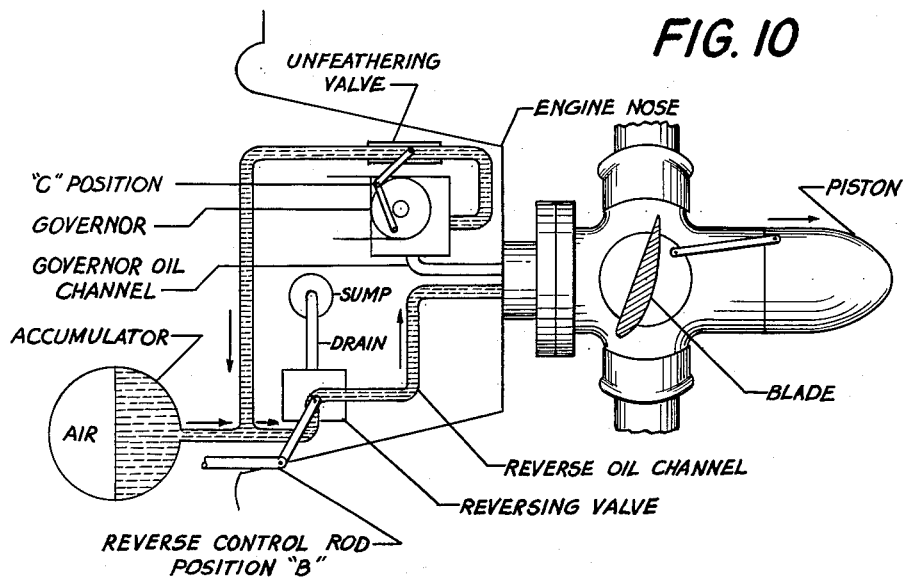
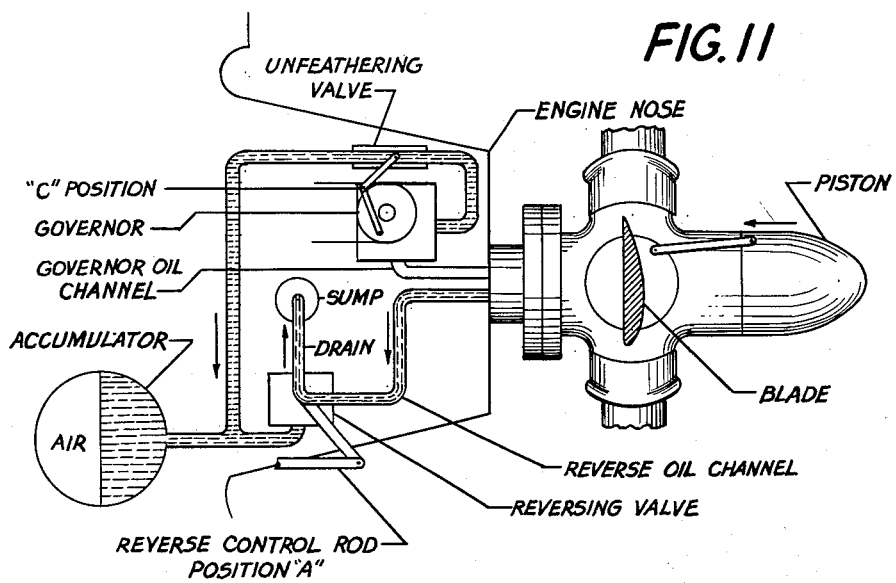

May 30, 1961 D. BIERMANN 2,986,222
ADJUSTABLE PITCH PROPELLER
Filed July 24, 1959 6 Sheets-Sheet 6

INVENTOR
DAVID BIERMANN

BY Toulmin & Toulmin

ATTORNEYS

United States Patent Office 2,986,222
Patented May 30, 1961

2,986,222
ADJUSTABLE PITCH PROPELLER
David Biermann, Piqua, Ohio, assignor to Hartzell Propeller, Inc., Piqua, Ohio, a corporation of Ohio
Filed July 24, 1959, Ser. No. 829,464
12 Claims. (Cl. 170—160.2)

This invention relates to aircraft propellers, and is particularly concerned with a propeller having adjustable pitch blades. Adjustable pitch propellers are standard equipment in modern propeller-driven aircraft and are ordinarily of a type which can be brought to a full-feathered condition in case of a motor failure to reduce wind resistance and to prevent windmilling of the motor.

Sometimes it is desired to provide a craft with braking means, and this can be accomplished by reversing the pitch on the propeller blades. Such braking means are useful in bringing the aircraft to a quick halt, for backing the aircraft up during ground or water handling operations, or for increasing the angle of descent.

In my application Serial No. 319,019 now U.S. Patent 2,722,895 there is shown a variable pitch propeller of the general nature with which this invention is concerned, except that the propeller in said application is not arranged for the move to reverse pitch position.

The present application may be considered as a continuation-in-part of the application Serial No. 555,521 filed December 27, 1955, now abandoned.

The present invention has as its primary object the provision of a variable pitch propeller in which the pitch of the propeller blades is normally adjustable between a predetermined maximum or minimum point, but in connection with which the pitch can readily be reversed.

A further object of the present invention is the provision of a simple arrangement for selectively reversing the pitch of an adjustable pitch propeller which is safe in operation and rapid in action.

A still further object of the present invention is the provision, in a variable pitch propeller structure, of an arrangement for reversing the pitch of the propeller blade which does not introduce extreme complexity in the propeller structure.

These and other objects and advantages of this invention will become more apparent upon reference to the following specification taken in connection with the accompanying drawings, wherein:

Figure 4 is a rather diagrammatic view showing the hydraulic control system, by means of which hydraulic fluid is supplied to and exhausted from the adjusting fluid motor of the propeller;

Figure 5 is a perspective view showing the arrangement of the telescoping tubes that form the valves for controlling the fluid flow to and from the pitch adjusting motor;

Figure 6 is a sectional view showing the telescoping tubes making up the valves referred to above;

Figure 7 illustrates diagrammatically how the propeller is actuated in the forward direction and showing associated actuating mechanism, for positioning the propeller;

Figure 8 is a similar view as Figure 7 and illustrating the feathering position;

Figure 9 is a similar view as Figure 8 and illustrating the unfeathering position of the propeller;

Figure 10 is a like view as Figure 9, and illustrating the reversing position of the propeller;

Figure 11 illustrates the return from reverse position of the propeller;

Figure 1:
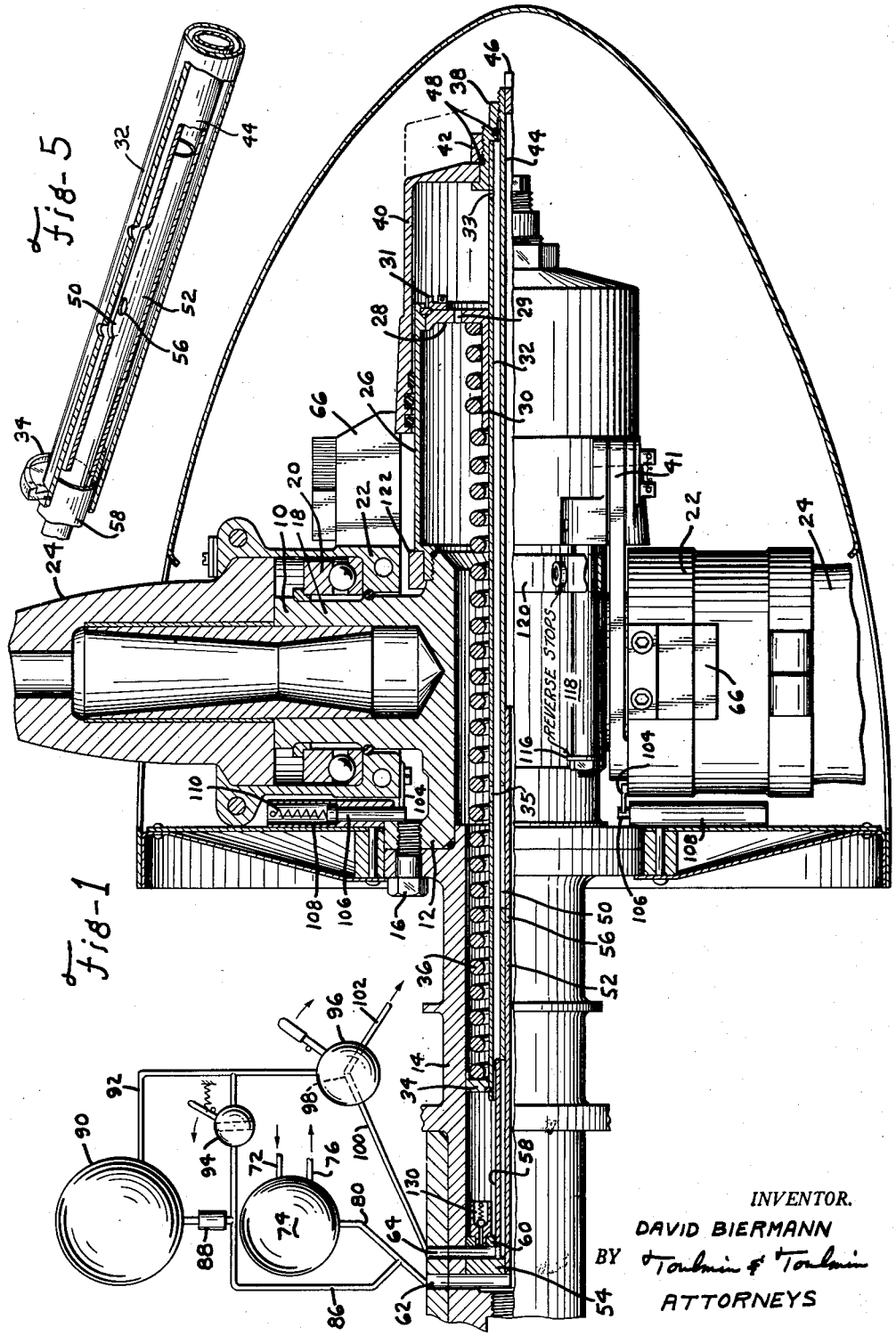
Figure 1 is a partial sectional view showing the hub region of the propeller constructed according to my invention, with the upper half of the figure showing the adjusting mechanism in minimum pitch position, and with the lower half of the figure showing the mechanism in maximum pitch position.
Figure 2:
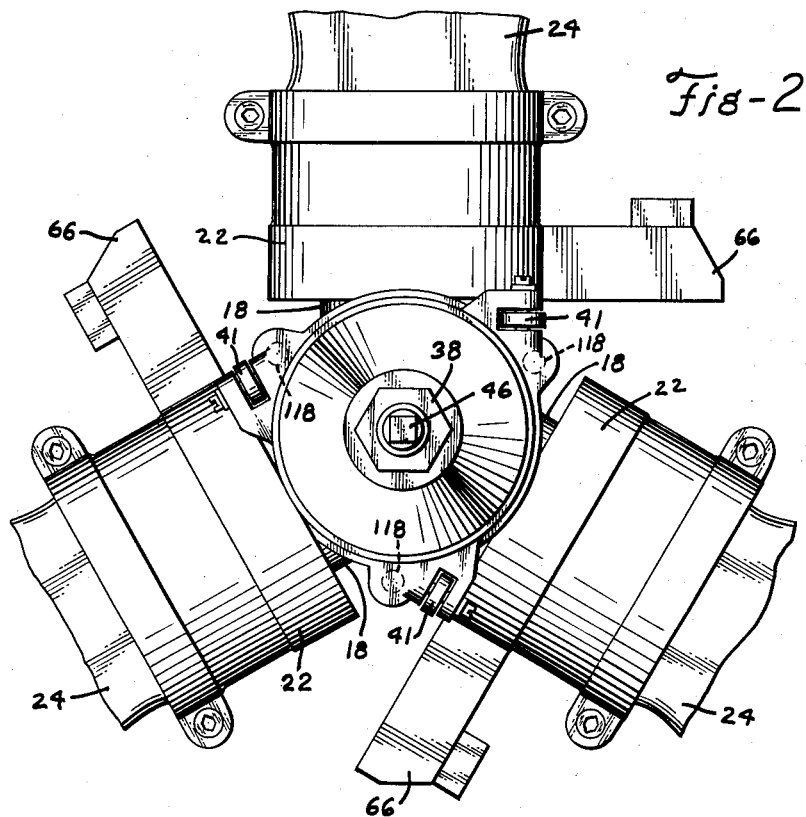
Figure 2 is a fragmentary end elevational view of the propeller with the cowl removed.

Referring to the drawings somewhat more in detail, the propeller according to the present invention comprises a central drive hub 10 secured by means of a flange 12 thereon to the end of an engine crankshaft 14 as by the cap screws 16. Hub 10 has radially projecting portions 18 which carry the thrust bearings 20 that are engaged by the clamp members 22, the outer ends of which clamp members grip the inner ends of propeller blades 24.

A stationary piston 26 is connected with hub 10 and extends outwardly therefrom, and has its outer end closed by a mushroom-shaped member 28 that includes a stem portion 30 bored for slidably fitting on a tube 32. Member 28 has a port 29 therein and carries a stop 31 which determines feathered position of the blades by limiting the rearward movement of piston 40. Tube 32, at its left end, carries a collar 34 against which one end of spring 36 abuts, the other end of spring 36 bearing against the left side of member 28.

The right end of tube 32 has fastened thereto a shouldered element 38 which provides means for connecting hollow cylinder 40 to the end of the said tube as by the nut 42. Cylinder 40 extends over the end of piston 26 and sealingly engages the same as by the packing means. Feather stop 31 engages the inside of cylinder 40 in the extreme left hand position thereof.

Blade links 41 are pivotally connected between the blade hubs and cylinder 40 to cause rotation of the blades when the cylinder moves.

Shouldered element 38 is internally threaded for receiving the threaded end of a tube 44, the outer end of which is closed by a plug or the like 46. Sealing means as at 48 prevent leakage between cylinder 40 and member 38 and tube 44.

Tube 44 extends leftwardly on the axis of the propeller hub into the hollow motor shaft 14, and has therein an elongated port 50. Tube 44 fits closely and slidably over a smaller tube 52, and which terminates at its right end in the region of the center of the hub 10 of the propeller, and at its left end is fixed within the motor shaft 14 as by the annular ring 54.

Tube 52 has a port 56 therein which may be round or rectangular and which is adapted for registering with port 50 in tube 44 while the propeller blades are in any positive pitch position between their minimum and maximum positions. This arrangement constitutes a valve means which substantially cuts off the fluid motor from the pressure source at a predetermined minimum pitch position.

Still a third, and yet shorter, tube 58 is located within the engine shaft, with its left end supported therein by the annular ring 60, and with the right end of the tube being arranged to slidably engage the outside surface of tube 44. This forms a value means that connects the fluid motor with exhaust when the propeller approaches minimum pitch position from the high pitch value.

Means are provided for supplying fluid to and exhausting fluid from the spaces defined by the tubes. One of these means consists of a port 62 extending in through shaft 14 to the interior of tube 52. A second of these means takes the form of a port 64 extending through shaft 14 into the space between annular rings 54 and 60 so that communication is had with the space between tubes 52 and 58. The interior of tube 32 communicates with cylinder 40 via port 33 and with the chamber containing spring 36 via port 35.

Each propeller blade has attached thereto, as being fixed to the clamp thereof, a counterweight 66 which tends to urge the propeller blade toward increased pitch position when the propeller is rotating during at least a portion of the angular movement of the propeller blades.

In addition to the forces exerted by counterweights 66, other forces act to control the pitch of the propeller blades, including the fluid pressure delivered to the inside of cylinder 40 which tends to reduce the propeller pitch, whereas exhausting of this cylinder will permit increasing of the propeller pitch under the influence of spring 36. Also the centrifugal force of the blades tends to reduce the pitch thereof.

As will be seen in Figures 1 and 4, there is a hydraulic circuit connected with the ports 62 and 64 for supplying fluid to and exhausting fluid from the inside of cylinder 40. This hydraulic circuit comprises a pump 68 having a suction side connected to sump 70, and having a discharge side that supplies pressure fluid through a conduit 72 to the inlet of a governor-controlled valve 74. Valve 74 has exhaust ports connected by conduit 76 with the sump 70, and also has a valve member 78 movable for controlling communication between the said inlet port and the said exhaust conduit and a conduit 80 leading to port 62.

A governor, such as a flyball governor 82, is connected with the stem of valve member 78 so that in response to an overspread condition the valve member 78 is moved upwardly to connect conduit 80 with exhaust, thereby to release hydraulic fluid from within cylinder 40 and thereby permitting an increase in the pitch of the propeller blades; whereas, an underspeed condition will bring about movement of valve 78 by said governor so as to connect conduit 80 with the pressure side of pump 68 to bring about a supply of pressure fluid to cylinder 40 that would reduce the pitch of the propeller blades.

To provide for movement of the propeller blades quickly to their full-feathered position, there is provided a manually-operated means, such as the cam 84, associated with the valve 74 and movable to shift valve member 78 into position to exhaust conduit 80 regardless of the condition of governor 82, thus permitting full-feathering of the propeller blades.

The conduit 80 connects with a branch conduit 86 leading through a check valve 88 to an accumulator 90, from which there leads a supply conduit 92 to one port of a two-way unfeathering valve 94, the other port of which is connected to conduit 86. Conduit 92 also leads to one port of a reversing valve 96 having one position where conduit 92 is connected via passage 98 within the valve with conduit 100 leading to port 64, and another position where the said passage connects conduit 100 with exhaust conduit 102 leading to sump 70.

According to the present invention, and also as disclosed in my patent referred to above, each propeller blade has associated therewith an automatic high stop plate 104 adapted for engagement by stop plunger 106 mounted in a barrel 108 and springpressed inwardly by compression spring 110. The arrangement is such that a predetermined rotational speed of the propeller, somewhere between 500 and 1000 r.p.m., will throw the plungers 106 outwardly by centrifugal force away from stop plates 104 to permit further changing of the propeller pitch.

Upon gradual slowing down of the propeller, such as by turning off the driving engine, the plungers 106 will move inwardly before the propeller blades move to a greatly increased pitch position, and are thus in position to engage the stop plates 104 and limit the maximum pitch of the propeller blades to a proper amount for starting the engine.

It will be understood that ordinarily when a propeller is feathered this will be accomplished when the propeller is rotating, and for this reason the stop plungers 106 will be in their outer positions and will not interfere with the feathering operation.

The reversing feature of the propeller of this invention involves a number of important changes in design over the conventional variable pitch propellers and which includes (a) The pitch range is increased from about 70° to 110°. This involves increasing the piston travel and the length of the feathering spring;

(b) A separate oil system is introduced for the reversing operation. This involved dual oil channels through the engine shaft and an oil distributor valve at the center of the propeller;

(c) A hydraulic low pitch stop is introduced along with the distributor valve, a separate forward operation from reverse operation. The basic constant speed and feathering of the propeller thus requires only a governor for the engine operation. The reversing feature, however, requires additional oil conduits for conveying the oil, as shown diagrammatically in Figures 7 to 11 and wherein the various operating steps are illustrated.

The principal features of construction are (1) the reversing valve;
(2) the accumulator;
(3) and connecting channels for conveying the oil under pressure.

Operation of the propeller is illustrated in the drawings and may be described briefly as follow:

With regard to different positions of the propeller (A) *Forward.*—(See Figures 1 to 7.) The propeller is actuated in the forward direction by oil pressure, supplied by a governor, to reduce pitch. Counterweights, attached to the blade clamps, tend to increase pitch in opposition to the oil supplied by the governor. In addition, the heavy spring, mounted within the hub, acts to aid the counterweights to increase pitch, particularly during the feathering operation.

Oil from the governor enters the propeller shaft and is directed to the piston by the oil distributor valve. This valve, which is actuated by the propeller piston, is open only between the low position and feathering position. At the low pitch stop position the distributor valve is not only substantially closed to the governor oil, but is effectively slightly open to the reversing channel which is connected to the engine sump. Thus any oil leakage past the valve ports drains to the engine sump at the low pitch stop position. In case the propeller enters the reverse pitch range (hypothetically), the distributor valve closes off the governor oil supply more securely, and opens up the drain passage leading to the engine sump. This allows oil to drain out of the propeller cylinder and the pitch returns to the low pitch valve.

During forward operation the governor supplies oil at relief valve pressure to the accumulator for storage under pressure.

(B) *Feathering.*—(Figures 1 and 8.) Feathering is accomplished by pulling back on the propeller control lever to the limit of its travel. This action open up a valve in the governor, allowing oil to drain out of the propeller into the engine sump, thereby feathering the blades. The blade counterweights and feathering spring supply the force. The unfeathering valve is closed (position D), at the same time the propeller is feathered, which traps oil under pressure in the accumulator. Feathering is usually accomplished in a period of 3 to 10 seconds.

(C) *Unfeathering.*—(See Figures 1 and 9.) Unfeathering is accomplished by returning the governor control lever to the normal range. This action opens the unfeathered valve and closes the governor drain valve. Oil from the accumulator enters the governor oil channel, which moves the propeller piston forward against the action of the feathering spring. The propeller usually starts to windmill by the time the pitch reaches the 45 degree mark, so that the engine can be started. The time required is about 3–4 seconds.

(D) *Reversing.*—(See Figures 1 and 10.) The propeller can only be reversed when the pitch is in the low stop position. The governor will move the propeller to the low stop position at times when the engine power is insufficient to maintain the r.p.m. called for by the governor, such as during gliding flight, landing, taxiing, and sitting stationary. Reversing cannot be accomplished in cruise flight because the oil distributor valve is closed to the reversing oil channel when the pitch is higher than the low value.

Reversing is accomplished by moving the reverse control valve to "B" position. This reverse control preferably is linked to the engine throttle in such a way as to make it possible to move the reverse valve only when the throttle is in the idle position. Otherwise, it would be possible to move the pitch through zero thrust position with engine throttle open, allowing the r.p.m. to exceed safe values. Oil from the accumulator, as well as the governor, enters the reverse oil channel and goes through the oil distributor valve into the propeller cylinder. This surge of high pressure oil (275 pound/sq. in. (p.s.i.)) from the accumulator will move the piston into the reverse position in 1 or 2 seconds against the action of the feathering spring.

As the governor is cut off from the propeller during reverse operation, it cannot affect the pitch control.

The reversible propeller of this invention in experimental tests has been found to be very efficient and in flight tests gave a high performance with twin engine airplanes and revealed excellent operational characteristics. The airplanes tested was landed at about 80 miles per hour and the propellers were reversed to obtain braking action. Power was then applied and the airplane slowed down to a standstill in a relatively short distance. The reversible propeller of this invention provided important advancements in safety features and which is an important aspect of the invention.

In a normal operation, assuming the propeller to be rotating at about the desired speed, the flyball governor 82 will hold valve member 78 in a neutral position and the propeller blades will be in some position between their minimum and maximum pitch positions.

At this time the interior of cylinder 40 communicates through ports 29 and 35, and also through port 33, with the interior of tube 32 and thence through elongated port 50 in tube 44 and port 56 in tube 52 with the interior of tube 52 and therethrough with port 62 and service conduit 80 leading from the governor-controlled valve 74.

As explained previously, any variation from the speed at which governor 82 is set will bring about exchange of fluid between cylinder 40 and either pump 68 or sump 70 in order to adjust the pitch of the propeller blades to restore the rotating system to the proper operating speed.

In the event the propeller is to be feathered, cam 84 is availed of for shifting valve member 78 upwardly to exhaust conduit 80 and therethrough to exhaust cylinder 40, whereupon spring 36 will thrust tube 32 and cylinder 40 leftwardly and rotate the propeller blades to maximum pitch position by means of links 41 connected between the cylinder 40 and the inner ends of the hubs of the propeller blades.

To unfeather the propeller cam 84 is returned to its normal position, thus restoring valve member 78 to the influence of governor 82 and, in order to provide a quick supply of hydraulic fluid to cylinder 40, valve 94 is shifted to connect conduit 92 with conduit 86, whereupon a rapid supply of fluid passes to cylinder 40 and moves the propeller to normal pitch position. Thereafter, unfeathering valve 94 is again closed.

When the propeller moves to full-feathered position it will be evident that stop 31 will engage and halt cylinder 40 in the proper position. When the propeller blades move toward reduced pitch position, however, it is not possible to provide a fixed stop of this nature because the propeller of the present invention is adapted for going over to reverse pitch position. A minimum pitch position control, however, is necessary and this is accomplished by the tubes 44, 52 and 58 and the ports 50 and 56.

When the propeller blades move from a higher pitch position toward their minimum pitch position elongated port 50 moves rightwardly relative to port 56, and at the desired minimum pitch position of the propellers port 50 has moved to its Figure 1 position relative to port 56, thus substantially cutting off a supply of pressure fluid to cylinder 40. At this time tube 58 is just off the end of tube 44. Leakage occurs from port 56 through port 50 tending to reduce the pitch of the propeller blades still further, this reduction in pitch will be accompanied by rightward movement of tube 44 and bring about immediate exhaust of cylinder 40 through tube 58, port 64, conduit 100, and channel 98 to exhaust conduit 102.

By "cutting off" the supply of pressure fluid to cylinder 40 is meant that there is no further effective supply of pressure fluid to the cylinder. This comes about because when leakage occurs through ports 50 and 56 tending to move cylinder 40 rightwardly, compensating leakage will occur past the end of tube 44 into tube 58. This comes about because when the tubes are in the position indicated in Figure 1, the right end of tube 58 is located just at the left end of the tube 44 whereby a balance is obtained between leakage into cylinder 40 and leakage from cylinder 40. The degree of this leakage will vary somewhat, being at a minimum when the tubes and the oil circulating therethrough is cold and, as a natural consequence of the tubes expanding as they become warm and the viscosity of the oil reducing as it becomes warm, the leakage is greater after the engine is warmed up than it is when the engine is cold.

The return of the propeller blades from a position of minimum pitch toward increased pitch is accomplished either by the governor control reducing the pressure inside tube 52, or by manually actuating cam 84 to cause conduit 80 to communicate with the sump 70. In either case the pressure within tube 52 is reduced and the interior of tube 58 is at exhaust pressure except when the propeller blades are in negative pitch and the cylinder 40 will accordingly move leftwardly toward increased pitch position.

The exact position which the propeller blades occupy when they are at minimum pitch can be adjusted by availing of the plug 46 for turning tube 44 to adjust it axially. This permits compensation for slight manufacturing irregularities in the propeller blades and in the other parts of the adjusting mechanism.

To place the propeller blades in reverse pitch position as explained, the valve 96 is shifted to place channel 98 in position to interconnect conduit 92 with conduit 100; whereupon, since the propeller blades were in their minimum pitch position, there will be a supply of pressure fluid from the accumulator through conduits 92 and 100 to port 64, thence through tube 58 after initial movement of the cylinder 40 to the right by pressure fluid admitted through check valve 130 to the interior of tube 32, and thence to the interior of cylinder 40 driving the said cylinder rightwardly and moving the propeller blades into reverse pitch position.

Immediate and rapid supply of fluid to cylinder 40 during this operation is provided through the check valve 130 which will allow pressure fluid to pass to cylinder 40 quickly even though the end of tube 58, is, at first, somewhat restricted by the end of tube 44.

This movement is stopped by the stop washers 116 on stop rods 118 that are fixed to cylinder 40 and which are slidable through the stop ears or collars 120 that are carried by the propeller hub in any suitable manner, such as by a mounting ring element 122. These stop means determine the maximum limit of movement of the blades in the reverse pitch position.

Return of the propeller blades from their reverse pitch position is accomplished simply by restoring the reverse valve to the position where channel 98 interconnects conduit 100 with exhaust conduit 102, whereupon cylinder 40 will be exhausted and the spring 36 will move the parts of the propeller toward positive pitch position.

It should be noted that whenever the propeller blades are in reverse pitch position, ports 50 and 56 are no longer in communication. This is important because, with the propeller in reverse pitch position, the governor 82 may call for an increase in propeller pitch, which would allow oil to drain from cylinder 40 to the sump, thereby permitting the propeller to move toward minimum pitch position and thereby cause the engine to overspeed or to run away.

It will be noted that the present invention entirely eliminates this possibility, and renders the governor-controlled mechanism ineffective whenever the propeller is in reverse position.

It should also be noted that, since reverse pitch operation is only used momentarily, a slight leakage of oil through port 56 will be unimportant since the accumulator has sufficient capacity to continue to supply oil to make up for this leakage for a considerable length of time.

Figure 3:
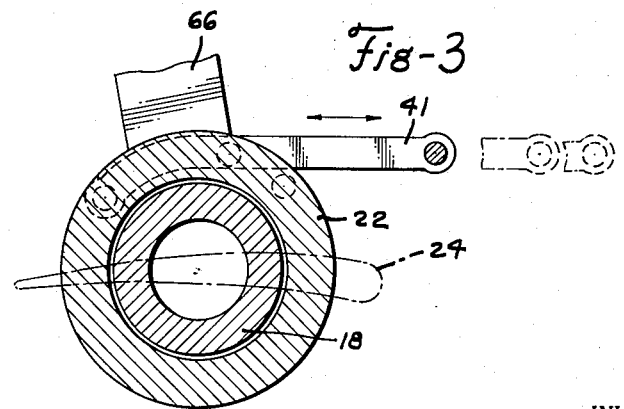
Figure 3 is a diagrammatic plan view showing the three limit positions of the propeller adjusting mechanism.

The diagram in Figure 3 shows the approximate pitch range required for a given type of propeller. A range of about 70° is provided between the low stop position and the feathering position; thus, if the low stop blade angle is 10° the feathering blade angle will be 80°, which has been determined to be the ideal setting, since, at this angle, the propeller tends to windmill in neither direction.

An additional pitch range of 30° from the low stop position to the reverse position is provided so that if the low stop position were plus 10° the reverse pitch position would be minus 20°, which is calculated to provide full power in reverse pitch operation for average conditions.

The particular values given above may, of course, be changed to meet any particular conditions.

Figure 12:
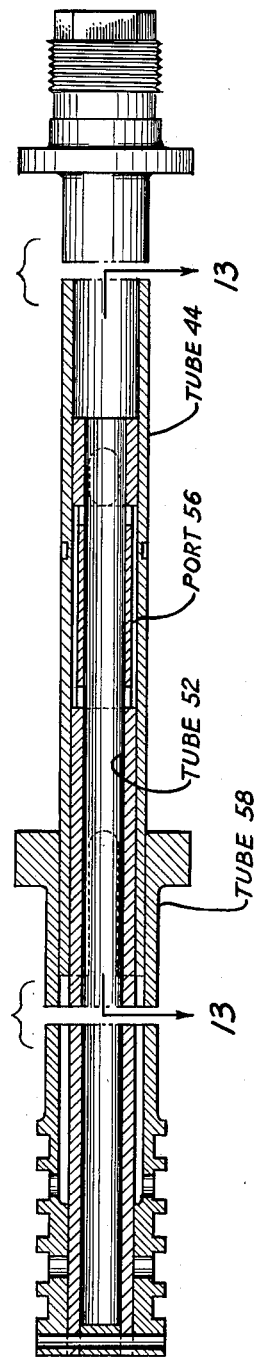
Figure 12 is a sectional view through the sleeve valve tube members, the mechanism being shown in the position occupied when the propeller is in minimum pitch position.
Figure 13:
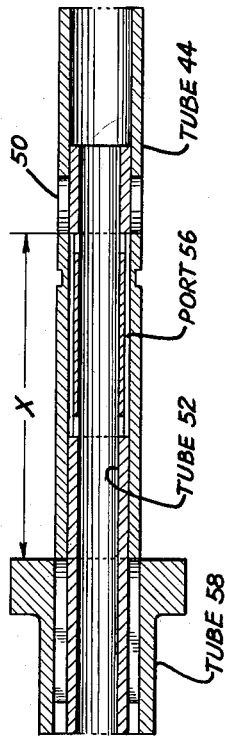
Figure 13 is a detailed sectional view taken along lines 13—13 of Figure 12.

In Figure 6 there is shown the tubular elements making up the valves that control the fluid flow to and from the pitch adjusting motor means. In this view it will be observed that the control tube 52 may have the port means therein in the form of a plurality of circumferentially spaced ports 57 so that angular adjustments of tube 44 will not in any way influence the degree of communication of port 50 in sleeve 44 with the port means in the inner sleeve 52. The valve structures, such as illustrated in Figures 12 and 13, show the relative position of the ports and land areas with respect to the manner in which they cooperate, and in particular with regard to the way the fluid pressure is applied to the pitch adjusting motor of the propeller. In accordance with my invention, the supply of pressure fluid to the pitch adjusting motor of the propeller is regulated to provide for a predetermined minimum pitch position of the propeller blades without utilizing mechanical stops whereby there is available in the propeller an extended range of pitch from full feathered through cruising pitch range and on into negative pitch.

In Figure 5, 12 and 13, the drawings, the sleeve valve mechanism is shown in more detail. The tubular sleeve valve mechanism comprises tube 44, tube 58, port 56, and tube 52, which are constructed and arranged to operate as shown. In the sleeve valve construction illustrated, the dimension marked X on tube 44 (Fig. 13) is substantially equal to the dimension from the end of tube 58 to the edge of port 56 in tube 52 nearest to the end of tube 58. The tubes and valve members illustrated in Figures 12 and 13 show the valve ports and land areas in the relationship that they occupy when the propeller is in minimum pitch position.

The invention has been tested on the propeller of an airplane and found to operate satisfactorily in every respect. Adjustment of the pitch of the propeller was effective from a feathered pitch position through cruising pitch range to a minimum pitch position, and also for selectively adjusting the propeller from minimum pitch position into reverse pitch position, and thence back through minimum pitch position into cruising pitch range.

An important application of the reversible variable pitch propeller of this invention is in the operation of flying boats or seaplanes and has been tested and found to be a praiseworthy operation in such seaplanes. While the twin float seaplane does not require the reversible propeller operation to the same degree as it has no wing tip floats to damage during docking maneuvers, it provides an important safety feature of operation.

It will be understood that this invention is susceptible to modification in order to adapt it to different usages and conditions and, accordingly, it is desired to comprehend such modifications within this invention as may fall within the scope of the appended claims.

I claim:

1. In a variable pitch propeller having blade means rotatable between feathered and negative pitch positions, resilient means urging said blades toward feathered position, a fluid motor responsive to fluid pressure for moving said blades toward negative pitch position, a source of fluid under pressure, a reservoir for fluid, a governor controlled valve connecting said fluid source with said motor when the propeller rotational speed is below governing speed and connecting said motor with said reservoir when said rotational speed is above governing speed, a second valve means responsive to movement of said blades to a predetermined minimum pitch position for interrupting communication between said governor controlled valve and said motor, and means for making said second valve means selectively ineffective.

2. In a variable pitch propeller having blades rotatable in a hub, a resilient means urging the blades toward feathered position and a fluid motor responsive to fluid pressure for moving the blades from feathered position through decreasing pitch positions to a predetermined negative pitch position, a source of fluid under pressure, a fluid reservoir at atmospheric pressure, a governor-controlled valve connecting said source with said motor when the propeller rotational speed is below governing speed and connecting said motor to said reservoir when the rotational speed is above governing speed, a second valve means operable in response to movement of said blades into a predetermined minimum pitch position for interrupting communication between said governor-controlled valve and said motor and for connecting said motor instead with said reservoir, and manually operable means for making said second valve means ineffective and for supplying pressure fluid to said motor.

3. In a variable pitch propeller having blades attached to a rotatable hub structure, a resilient means continuously urging said blades toward feathered position, a fluid motor connected with the blades and operable responsive to fluid pressure for moving the blades from their feathered position to a predetermined minimum pitch position and then on to negative pitch position, a source of fluid under pressure connected to said fluid motor, a reservoir under atmospheric pressure, a governor-controlled valve connecting said fluid source with said motor when the propeller is rotating at speeds below governing speed and connecting said reservoir with said motor when the propeller is rotating at speeds above governing speed, a second valve means movable by said fluid motor and operable to maintain communication between said governor-controlled valve and said fluid motor when said propeller blades are at or above a predetermined minimum pitch position, said second valve being operable for connecting said fluid motor with said reservoir when the propeller blades are at or below said predetermined pitch, and a third valve means movable for interrupting said exhaust connection and connecting said fluid motor to a source of pressure for moving the blades into said negative pitch position.

4. In a variable pitch propeller having blades movable between feathered and negative pitch position, resilient means urging said blades toward their feathered position, a fluid motor connected to said blades and responsive to fluid pressure for moving the blades toward their negative pitch position, a source of fluid under pressure connected to said fluid motor, a reservoir under atmospheric pressure, a governor-controlled valve connecting said source of pressure with said fluid motor when the propeller is rotating below governing speed and connecting said reservoir with said motor when the propeller is rotating above governing speed, a second valve means arranged to be moved by said motor and responsive to movement of said motor and blades to disconnect said fluid motor from said governor-controlled valve at a predetermined minimum pitch position of said blades and then connect said motor with said reservoir.

5. In a variable pitch proller comprising blades attached to a rotatable hub structure; fluid motor means connected with the blades and operable responsive to fluid pressure for moving the blades from feathered position to a predetermined minimum pitch position and on to reverse pitch position, a source of fluid under pressure connected to said fluid motor, a reservoir under atmospheric pressure, a governor-controlled valve connecting said fluid source with said motor in response to a reduction of the rotational speed of said propeller below a predetermined governing speed and connecting said reservoir with said motor upon an increase in the speed of said propeller above a predetermined governing speed, control means operable by said fluid motor to substantially disconnect said fluid motor from said governor-controlled valve when said blades reach said predetermined minimum pitch position and to connect said fluid motor with said reservoir thereby determining a predetermined minimum pitch position of said blades, valve means selectively operable for interrupting said connection to said reservoir and for supplying pressure to said fluid motor for moving said blades to said reverse pitch position, and stop means for determining the maximum limits of movement of said blades.

6. In a variable pitch propeller comprising blades attached to a rotatable hub structure; fluid motor means connected with the blades and operable responsive to fluid pressure for moving the blades from feathered position to a predetermined minimum pitch position and on to reverse pitch position, a reservoir under atmospheric pressure, a first source of fluid under pressure connected to said fluid motor, a governor-controlled valve connecting said fluid source with said motor to bring about fluid supply to said motor responsive to a reduction of the rotational speed of said propeller below a predetermined governing speed and connecting the fluid motor to said reservoir upon an increase in the speed of said propeller, above a predetermined governing speed, control means operable by said fluid motor to substantially disconnect said fluid motor from said governor-controlled valve upon said blades reaching said predetermined minimum pitch position and to connect said motor with said reservoir thereby determining a predetermined minimum pitch position of said blades, a second source of fluid under pressure, and valve means selectively operable for interrupting said exhaust connection while connecting said fluid motor with said second source of fluid under pressure.

7. In a variable pitch propeller comprising blades attached to a rotatable hub structure; fluid motor means connected with the blades and operable responsive to fluid pressure for moving the blades of the propeller from feathered position to a predetermined minimum pitch position and on to reverse pitch position, a first source of fluid under pressure connected to said fluid motor, a reservoir under atmospheric pressure, a governor-controlled valve connecting said fluid source with said motor to bring about fluid supply to said motor responsive to a reduction of the rotational speed of said propeller below a predetermined governing speed and to exhaust to said reservoir upon an increase in the speed of said propeller above a predetermined governing speed, control means operated by said fluid motor to substantially disconnect said fluid motor from said governor-controlled valve upon said blades reaching said predetermined minimum pitch position and to connect said motor with said reservoir thereby determining a predetermined minimum pitch position of said blades, a second source of fluid under pressure, and valve means selectively operable for interrupting said reservoir connection while connecting said fluid motor with said second source, said first fluid pressure source comprising a pump, and said second fluid pressure source comprising an accumulator supplied by said pump.

8. In a variable pitch propeller having blades attached to a rotatable hub structure, a spring urging the blades toward feathered position and a fluid motor connected with the blades and operable responsive to fluid pressure for moving the blades from feathered position through decreasing pitch positions to a predetermined negative pitch position, a source of fluid under pressure connected to said fluid motor, a reservoir under atmospheric pressure, a governor-controlled valve connecting said fluid source with said motor when the propeller is rotating below a predetermined governing speed and connecting said reservoir with said motor when the propeller is rotating above a predetermined governing speed, valve means associated with said fluid motor and operable in response to movement of said blades into a predetermined minimum pitch position for substantially interrupting fluid pressure to said motor and for establishing connection from said motor to said reservoir, and valve means for interrupting said reservoir connection and for supplying pressure fluid to said motor, and manual means for over-riding said governor-controlled valve and connecting said motor with said reservoir, thereby causing the blades to move to feathered position independently of the action of said governor.

9. In a variable pitch propeller having blades attached to a rotatable hub structure, a spring urging the blades toward feathered position and a fluid motor connected with the blades and operable responsive to fluid pressure for moving the blades from feathered position through decreasing pitch positions to a predetermined negative pitch position, a source of fluid under pressure connected to said fluid motor, a reservoir under atmospheric pressure, a governor-controlled valve connecting said source with said motor when the propeller rotational speed is below a predetermined governing speed and connecting said reservoir with said motor when the rotational speed is above a predetermined governing speed, second valve means associated with said fluid motor and operable in response to movement of said blades into a predetermined minimum pitch position for substantially interrupting comunication between said governor controlled valve and said motor and for connecting said motor to said reservoir, and third valve means inserted between said motor and said reservoir movable for interruption of said connection and also connecting said fluid source under pressure to said motor, means for exhausting said fluid motor to move the blades to feathered position independently of the influence of the said governor, there being a second source of fluid under pressure of substantial capacity, and means adapted for connecting said source with said motor to move said blades quickly out of feathered position.

10. In a variable pitch propeller, a hub mounted on an engine, a plurality of blades rotatably movable with respect to said hub, a hydraulic piston mounted on said hub concentric to the axis of propeller rotation, a cylinder slidably mounted on said piston, link arms connecting said cylinder with said blades for rotation thereof upon sliding motion of said cylinder, weights attached to said blades responsive to rotation of the propeller to urge said blades toward increased pitch position, a spring acting on said cylinder and operable to increase blade pitch, stop means for limiting the blade travel to feathered position at one extreme and a predetermined reverse pitch position at the other extreme, hydraulic governor means operable to supply oil to said cylinder to reduce blade pitch in response to below governing speed conditions and to drain oil from said cylinder in response to above governing speed conditions to thereby vary the blade pitch to maintain the speed of the propeller normally constant at the governing speed, a first valve connecting said governor oil source with said cylinder, said first valve having one element fixed relative to said hub and a second element attached to said cylinder for movement therewith, said elements having cooperating ports arranged to be in register over a pitch range between a predetermined low pitch position and feathered pitch position, an oil sump, a second oil source under pressure, a second valve communicating with said cylinder on one side having a first element fixed relative to said hub and a second element attached for movement with said cylinder, said elements defining a valve, a flow passage through the valve open only when the pitch of the propeller lies at or between said predetermined low pitch value and reverse pitch, a manually operated two-way valve having one position for connecting said second oil source with said first element of said second valve and a second position for connecting said first element of said second valve with said oil sump, and a third manually actuated on-and-off valve between the governor side of said first valve and second oil source for unfeathering said blades.

11. In a variable pitch propeller having blades attached to a rotatable hub structure, resilient means urging the blades thereof toward increased pitch position and an expansible fluid motor for moving the propeller blades toward decreased pitch position, one element of said motor being mounted on the hub of said propeller and the other element of said motor being slidably mounted on the first element and connected with the blades for rotating the same to vary pitch thereof, means for supplying fluid to said motor comprising a first sleeve fixed to said hub, a second sleeve fixed to said second element of said motor and telescoping over said first sleeve, means communicating the exterior of said second sleeve with said motor, governor controlled means for supplying fluid under pressure to the interior of said first sleeve, said first and second sleeves having ports adapted for remaining in registration while the propeller blades are in positive pitch and moving out of registration when the blades reach a predetermined pitch in the region of low pitch, and means operable manually, independent of said governor controlled means, for selectively exhausting said fluid motor and for supplying the same with fluid pressure after said ports have moved out of registration.

12. In a variable pitch propeller having blades attached to a rotatable hub structure, resilient means urging the blades thereof toward increased pitch position and an expansible fluid motor for moving the propeller blades toward decreased pitch position, one element of said motor being mounted on the hub of said propeller and the other element of said motor being slidably mounted on the first element and connected with the blades for rotating the same to vary the pitch thereof, means for supplying fluid to said motor comprising a first sleeve fixed to said hub, a second sleeve fixed to said second element of said motor and telescoping over said first sleeve, means for supplying fluid under pressure to the interior of said first sleeve, means communicating the exterior of said second sleeve with said motor, said sleeves having ports adapted for remaining in registration while the propeller blades are in predetermined position pitch range and moving out of registration when the blades reach a predetermined pitch in the region of low pitch, a third sleeve fixed relative to said hub and telescoping over the end of said second sleeve opposite its connection with said second element of said motor, said second sleeve being arranged to move out of the end of the third sleeve as the said ports move out of register, and manually operable means for selectively exhausting the interior of said third sleeve and for supplying fluid under pressure thereto.

References Cited in the file of this patent

UNITED STATES PATENTS

| 1,723,617 | Hele-Shaw | Aug. 6, 1929 |
| 2,308,228 | Matteucci | Jan. 12, 1943 |
| 2,343,416 | Keller | Mar. 7, 1944 |
| 2,722,985 | Biermann | Nov. 8, 1955 |
| 2,808,891 | Stuart | Oct. 8, 1957 |
| 2,850,105 | Brandes | Sept. 2, 1958 |